3,453,092
BORON, NITROGEN AND HYDROGEN
CONTAINING COMPOUNDS
Marion F. Hawthorne and Anthony R. Pitochelli, Huntsville, Ala., assignors to Rohm & Haas Company, Philadelphia, Pa., a corporation of Delaware
No Drawing. Continuation-in-part of application Ser. No. 786,341, Jan. 12, 1959. This application Feb. 16, 1960, Ser. No. 9,137
Int. Cl. C01b 6/22, 6/08
U.S. Cl. 23—358          11 Claims This application is a continuation-in-part of Ser. No. 786,341, filed Jan. 12, 1959, now abandoned.

This invention concerns nitrogen containing derivatives of decaborane and processes for the preparation thereof.

Incorporation of boron in propellants should produce a considerable increase in the energy available when the propellants are burned. Although boron could be added directly to propellant compositions it is much more effective when incorporated in a boron-hydrogen compound such as decaborane. However, these boron hydrogen compounds (even decaborane, the most stable boron hydride) are not sufficiently stable to be incorporated directly in propellants.

Several compounds based on decaborane have been made and incorporated in propellants containing such oxidizers as ammonium perchlorate or potassium perchlorate; combustion of the boron in these compositions leads to the formation of various boron oxides. Greater energies are theoretically available if the boron is used in a composition which results in the formation of boron nitride. The nitrogen should desirably be contained in the boron molecule.

One prior art process for the formation of a nitrogen containing boron compound consisted in reacting decaborane with hydrazine, but only complex mixtures of unidentifiable compounds were produced. Yields of the mixtures were low and the mixtures were unstable.

A process for making stable nitrogen containing decaborane-compounds of known configuration has long been sought.

An object of the present invention is to make available stable nitrogen containing compounds of decaborane of known configuration.

Another object of the present invention is to make available a process for the manufacture in high yields of stable nitrogen containing compounds of decaborane.

Another object of the present invention is to make available stable nitrogen containing compounds of decaborane and hydrazine which can be satisfactory used as high energy components of solid or liquid propellants.

A process of the present invention comprises reacting the addition product of decaborane and two moles of a lower alkyl nitrile such as acetonitrile, $B_{10}H_{12} \cdot 2CH_3CN$, with hydrazine, conducting the reaction in the presence of an organic liquid which is non-reactive with hydrazine, the addition product of decaborane and acetonitrile, and the product of the reaction, in which organic liquid hydrazine is sufficiently insoluble to form a separate layer therewith. The decaborane-acetanitrile adduct dissolves readily in the hydrazine layer, and when solution is complete, the two phase system is heated to reflux with agitation for several hours. The mixture is then cooled to room temperature and the inert solvent layer is decanted. The hydrazine-containing layer is heated on a steam bath and an organic liquid which is miscible with hydrazine and from which organic liquid the diammoniodecaborane-12-hydrazinate crystallizes on cooling to room temperature or lower is added to extract the excess hydrazine from the adduct. The solution is then cooled and allowed to stand overnight at a temperature of about 0° C. to about 10° C. The crystals which form are removed by filtration. If desired, the excess hydrazine can be recovered from the filtrate. Under these reaction conditions, the diammoniodecaborane-12-hydrazinate, $$NH_3(B_{10}H_{12})NH_3 \cdot N_2H_4$$

is formed. In the specification, examples and claims, the compound diammoniodecaborane-12 has the formula $NH_3(B_{10}H_{12})NH_3$.

The decaborane-acetonitrile adduct, $B_{10}H_{12} \cdot 2CH_3CN$, may be prepared by the method of Schaeffer as set forth in J. Am. Chem. Soc., 79, 1006 (1957), and this method of preparation is incorporated herein by reference.

Hydrazine acts as a solvent for the decaborane-acetonitrile adduct, which adduct has low solubility in most other solvents. Thus, it is necessary to use more hydrazine than required for chemical reaction. Molar ratios of said adduct to hydrazine of 1 to 10 to 1 to 30 are desirably employed, a molar ratio of 1 to 15 being a preferred embodiment. The excess hydrazine is extracted at the end of the reaction. The hydrazine used can be the commercially available 95% grade, or anhydrous hydrazine may be employed.

The reaction between the adduct and hydrazine is exothermic and proceeds readily over a wide temperature range from about 20° C. to temperatures in excess of 113° C. The upper temperature of 113° C. is a limitation imposed by the boiling point of hydrazine, and if it is desired to conduct the reaction at temperatures in excess of 113° C., i.e., with the hydrazine refluxing, an inert gas sweep, employing nitrogen, helium, etc. may be used. Higher temperatures can be obtained by refluxing under pressure. A preferred temperature range is from 80° to 120° C., this range permitting good control of the exotherm, and giving rapid reaction rates with high yields.

Organic liquids suitable as reaction media include aromatic and aliphatic hydrocarbons, although ethers may also be used. Thus, the reaction has been conducted in diethyl ether at room temperature with satisfactory results but the reaction time was longer at the lower reflux temperature of the ether solution. While a large number of aliphatic and aromatic hydrocarbons can be used as the reaction media, benzene, hexane, and heptane, or mixtures of such hydrocarbons are preferred because they reflux at temperatures essentially in the preferred reaction temperature range. Benzene in particular has proven to be very suitable.

The time of reflux is not particularly critical and the duration of reflux will depend somewhat on the boiling point of the solvent employed. Using benzene or heptane as solvent, a reflux period of 2 to 5 hours can be employed, with 2 to 3 hours being preferred.

A lower alkanol can be employed as the hydrazine-miscible organic liquid to extract the excess hydrazine from the desired adduct. Methanol, ethanol, propanol, or butanol can be employed as the lower alkanol which is added to the hydrazine layer after decantation of the inert solvent. Because of convenience in handling, ethanol is the preferred alkanol. The crystalline solid which precipitates on cooling the lower alkanol solution can be further purified by dissolving it in 95+% hydrazine and precipitating it by addition of a lower alkanol.

The amount of the lower alkanol used is not particularly critical since it is employed only as a solvent for the recrystallization of the reaction product and for the extraction of the excess hydrazine. Depending on the lower alkanol employed, from about 15 volumes to about 30 volumes of alkanol per volume of hydrazine is sufficient to give the desired crystallization.

Diammoniodecarborane-12 and diammoniodecaborane-12 hydrazinate are stable crystalline compounds which do not melt up to 280° C. The compounds are interconvertible as set forth hereinafter in Example I. Whereas diammoniodecarborane-12 hydrazinate is somewhat impact sensitive (50% fire level, 23 inches; RDX control, 20 inches), diammoniodecarborane-12 is completely insensitive under the conditions of the impact test. Neither substance is affected by air or moisture, although very large crystals of the hydrazinate become opaque on the surface on prolonged storage, presumably by vaporization of hydrazine to leave diammoniodecaborane-12.

Both compounds exhibit marked insolubility in most organic solvents, although tetrahydroforan dissolves diammoniodecaborane-12 and the hydrazinate to some extent. Diammoniodecaborane-12 is completely stable to boiling water and may be recrystallized from this solvent, although very large volumes must be used because of the low solubility of diammoniodecaborane-12 in water. Diammoniodecaborane-12 dissolves in but will not react with acetone even on prolonged boiling.

The mole of hydrazine in diammoniodecaborane-12 hydrazinate is bound weakly enough to be easily stripped off. Solvents in which diammoniodecaborane-12 is soluble at elevated temperatures and from which diammoniodecaborane-12 crystallizes at room or lower temperatures, which solvents will remove hydrazine from hydrazinate by reaction with the hydrazine or by solvating it, can be used to prepare the diammoniodecaborane-12 from the hydrazinate. Thus, recrystallization of the hydrazinate from aqueous solution or from aldehydes or ketones yields diammoniodecaborane-12. Similarly, presumably by the release of hydrazine, the hydrazinate inhibits the polymerization of acrylates, methacrylates, and other ethylenically unsaturated compounds.

Diammoniodecaborane-12 can also be prepared from the hydrazinate by heating the hydrazinate in vacuo until the evolution of hydrazine ceases. Since diammoniodecaborane-12 is very stable and does not melt or decompose on heating to 280° C. at atmospheric pressure, the temperature employed during the in vacuo heating is not critical. However, since hydrazine boils at 113° C. at atmospheric pressure, and the release of hydrazine in vacuo from the hydrazinate is rapid, there is little to be gained by heating the hydrazinate in vacuo at temperatures in excess of about 120° C.

Acetonitrile is not the only aliphatic nitrile which forms adducts with decaborane which will react with $N_2H_4$ to form diammoniodecaborane-12 or diammoniodecaborane-12 hydrazinate. Lower alkyl nitriles of the formula RCN in which the R contains 1 to 4 carbon atoms are satisfactory. Thus, when R is ethyl, propyl, and butyl, satisfactory results are obtained.

It has also been found that the nitrile-decaborane adducts when refluxed with sodium or potassium hydroxide in the presence of methanol will give diammoniodecaborane-12.

The dialkyl sulfide adducts of decaborane in which the alkyl group contains 1 to 4 carbon atoms will react with ammonia under pressure to give diammoniodecaborane-12. Typical of these dialkyl sulfide adducts are:

$$((CH_3)_2S)_2 \cdot B_{10}H_{12}$$

$$((C_2H_5)_2S)_2 \cdot B_{10}H_{12}$$

$$((C_4H_9)_2S_2 \cdot B_{10}H_{12}$$

The reaction temperature should be in the range from about 80° to 120° C., with preferred range being from 100 to 110° C. The preferred method of operation is to dissolve the dialkyl sulfide-decaborane adduct in an inert solvent, such as benzene, and saturate the solution in an autoclave with ammonia. The reaction mixture is then heated to 100° to 110° C. for about 1.5 to 4 hours. A two-hour heating period at this temperature is preferred. On cooling the reaction mixture, diammoniodecaborane-12 separates and is recovered by filtration. Yields are in the 85% range.

Decaborane ($B_{10}H_{14}$) will react with ammonia under autoclave conditions to produce diammoniodecaborane-12. In this process, also, the decaborane is dissolved in an inert solvent, such as benzene, charged to an autoclave, and gaseous ammonia passed into the solution until there is no further increase in pressure. The reaction mixture is then heated to 80° to 120° C. for 8 to 4 hours, the shorter time being the higher temperature. When using a reaction mixture temperature of 110° C., heating for 6 hours is required. The reaction mixture is then cooled to a room temperature and the diammoniodecaborane-12 which separates is recovered by filtration. The yields are in the range of 90 to 95% of theoretical.

Diammoniodecaborane-12 is peculiarly stable towards hydrazine and compounds which react readily with hydrazine. Thus, as set forth hereinbefore, diammoniodecaborane-12 can be crystallized from aqueous solutions as well as from solutions of aldehydes and ketones, and can be prepared from the hydrazide in this manner.

Suitable ketones for use in preparing diammoniodecaborane-12 from the hydrozine include lower alkyl ketones of which the following are illustrative: acetone, methyl ethyl ketone, diethyl ketone, and methyl propyl ketone. Suitable aldehydes include propionaldehyde, butyraldehyde, valeraldehyde, etc.

Conversely, dissolution of diammoniodecaborane-12 in an excess of hydrazine followed by addition of a lower alkanol causes formation of the hydrazinate. In contrast to the hydrazinate, diammoniodecaborane-12 not inhibit the polymerization of ethylenically unsaturated compounds.

The process of the present invention makes it possible to obtain yields of crystalline diammoniodecaborane-12 and the hydrazinate as high as 85% to 90% of theoretical.

Diammoniodecaborane-12 and diammoniodecaborane-12 hydrazinate are particularly suitable as propellant components because of their nitrogen content and their high boron content. They may be used in both solid and liquid systems.

Solid propellant compositions were prepared by mixing the high energy compounds of the present invention with an oxidizer therefor. Perchlorates including lithium, sodium, potassium and ammonium perchlorates are commonly used as oxidizers in propellant compositions. Nitrates also function as oxidizers and ammonium, lithium, sodium, or potassium nitrates alone or in admixture with perchlorates are suitable. Fluorine or oxygen are also effective oxidizers for the compounds of the present invention. Propellant compositions were prepared by mixing the compounds of the present invention with ammonium perchlorate, which perchlorate is frequently used as an oxidizer in solid propellant compositions. The particle size of the ammonium perchlorate can be in the range of 35 to 50 microns, with a 40 micron particle size being preferred. The compositions employed and the results of the tests appear hereinafter in Table I. The details of a typical preparation of a propellant composition were as follows: 0.254 gram of diammoniodecaborane-12 was pulverized in a mortar and blended by tumbling with 0.746 gram of ammonium perchlorate (40 micron particle size). The well-blended mixture was then pelletized for the heat of explosion test. The impact sensitivity test was conducted on the blended powder as such (i.e. not pelletized). Propellant compositions were prepared in the same manner with the hydrazinate.

TABLE I.—PROPELLANT COMPOSITIONS

| | | |
|---|---|---|
| Diammoniodicaborane-12, percent | 25.4 | 20.4 |
| Ammonium perchlorate, percent | 74.6 | 79.6 |
| $I_s$ (in inches) | 3.5 | 5.6 |
| $H_{ex}$ (calories/gram) | 1,668 | 1,798 |
| Diammaniodecaborane-12 hydrazinate, percent | 23.7 | 29.3 |
| Ammonium perchlorate, percent | 76.3 | 70.7 |
| $I_s$ (in inches) | 4.2 | 3.5 |
| $H_{ex}$ (calories/gram) | 1,613 | 1,658 |

NOTE.—$I_s$ is impact sensitivity in inches at the 50% fire level with a 2 kg. weight. $H_{ex}$ is heat of explosion by the standard test employed for explosives.

Although ammonium perchlorate was used as oxidizer in these compositions for the purpose of illustrating the use of the compounds of the present invention in propellant compositions, other oxidizer including those set forth hereinbefore can be used with equally satisfactory results and it is not intended to limit the choice of oxidizer to ammonium perchlorate alone.

Diammoniodecaborane-12 in hydrazine solution may also be used as a storable non-cryogenic liquid monopropellant.

The solubility of purified diammoniodecaborane-12 in hydrazine which contained 0, 7, and 13.1% water (by weight) was determined over the temperature range 15–30° C. These values are shown below.

TABLE II.—SOLUBILITY OF DIAMMONIODECABORANE-12 IN AQUEOUS HYDRAZINE

| Temp., ° C. | Grams solute per gram solvent | | |
|---|---|---|---|
| | 100% $N_2H_4$[1] | 93.0% $N_2H_4$ | 86.9% $N_2H_4$ |
| 15 | 0.660 | 0.573 | 0.498 |
| 20 | 0.669 | 0.579 | 0.495 |
| 25 | 0.676 | 0.576 | 0.493 |
| 30 | 0.742 | 0.596 | 0.479 |

[1] These were the only solutions which would fire on impact (20 in. with 1 kilogram weight).

The heat of explosion of a saturated solution of diammoniodecaborane-12 (7.12 moles $N_2H_4$/mole of diammoniodecaborane-12) was approximately 1400 cal./gram. As hydrazine was removed from this system the heat of explosion increased to approximately 2000 cal./gram.

Best estimates of the heat of formation of diammoniodecaborane-12 give a calculated impulse for a practical monopropellant of 285 lb. f.-sec./lb. m. at chamber pressure of 1000 p.s.i. expanded to 14.7 p.s.i.

This application is a continuation-in-part of Ser. No. 786,341, filed Jan. 12, 1959, which will be abandoned on Feb. 21, 1960 by failure to respond within the statutory period.

The following examples set forth certain well defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

Example I

In a typical preparation, 100 g. of the decaborane-acetonitrile adduct ($B_{10}H_{12}\cdot2CH_3CN$), hereinafter referred to as "BAND," is suspended in 300 cc. benzene in a 3-necked 2-liter flask fitted with a water condenser, mechanical stirrer, dropping funnel, and drying tube. A 180-cc. portion of 95+% hydrazine is added dropwise to the stirred suspension, maintained at 0–5° by means of an ice-water bath (BAND dissolves exothermically in hydrazine). After addition is completed, the ice bath is replaced by a mantel and the stirred solution heated to reflux and maintained at reflux for two hours. The mantel is then removed and the two-phase system allowed to cool somewhat before continuing. (Normally, at this point, the benzene layer will take on a deep red coloration due to a benzene-soluble compound resulting from reaction of actanitrile with hydrazine.)

At this point, the procedure varies, depending on which compound is desired. If diammoniodecaborane-12 hydrazinate is the desired product, the benzene layer is decanted and the hydrazine layer poured into a large Erlenmeyer flask on a steam bath and 1.5–2 liters 95% ethanol added portionwise. The suspension resulting is allowed to cool, the crystals are filtered and washed with ethanol and ether and air-dried. When the suspension is refrigerated overnight before the crystals are isolated, yields of 88% to 90% of diammoniodecaborane-12 hydrazinate ($B_{10}H_{22}N_4$) are obtained. Normally, a water-soluble organic by-product floats to the top of the suspension and may be removed manually before filtration. Diammoniodecaborane-12 hydrazinate may be recrystallized by dissolving it in 95+% $N_2H_4$ and precipitating the product from the heated solution with ethanol.

Analysis.—Calculated for $B_{10}H_{22}N_4$: B, 58.11%; H, 11.82%; N, 30.10%. Found: B, 59.3%; H, 11.83%; N, 30.23%.

To obtain diammoniodecarborane-12, water instead of ethanol is added to the warm hydrazine layer. Very finely divided white crystals precipitate immediately. Ice may be added to the suspension to increase the yield. By using 2–3 liters of ice water for isolation, yields of 95% diammoniodecaborane-12 ($B_{10}H_{18}N_2$) can be obtained. To rid the diammoniodecaborane-12 of the pink organic by-product, it is washed with cold water until white. It may then be washed with ethanol and ether and air-dried.

Analysis.—Calculated for $B_{10}H_{18}N_2$: B, 70.17%; H, 11.67%. Found: B, 69.2%; H, 11.8%.

Diammoniodecaborane-12 may also be obtained by conversion of the hydrazinate. Recrystallization of diammoniodecaborane-12 hydrazinate from boiling water gives diammoniodecaborane-12 in 89% yield. The overall yield of diammoniodecaborane-12 from BAND by this route is approximately 80%. Consequently, if diammoniodecaborane-12 is the desired product, the first method outlined is recommended. However, the conversion method does yield diammoniodecaborane-12 as very pure, well-defined crystals.

Diammoniodecaborane-12 may be recrystallized either from boiling water alone, or, more rapidly, by dissolving it in hydrazine and adding water to the solution.

Example II

Five g. BAND, 1.4 g. KOH, and 100 cc. absolute MeOH were refluxed for 4 hours, during which time 0.24 liter $H_2$ were generated. A white solid remained undissolved. This was separated by filtration and the filtrate evaporated almost to dryness. The solid so isolated was washed with water and isolated by filtration. Both the undissolved solid and the solid from the filtrate were diammoniodecaborane-12. The identity of the compound was confirmed by comparison of its infrared spectrum with that of authentic diammoniodecaborane.

In a similar fashion, the reaction was conducted with the adduct of decaborane and butyronitrile. Comparable yield of diammoniodecaborane-12 was obtained.

Example III

Five g. of the adduct of decaborane and 2 moles of diethyl sulfide (BESD) were dissolved in 150 cc. of dry benzene and placed in a 300-cc. autoclave. Ammonia gas was passed into the autoclave while the solution was stirred until the autoclave gauge registered pressure; initially, the ammonia is absorbed by the solution due to the formation of an ammonia-BESD complex. The autoclave was closed and heated to 110° for two hours. Only a slight pressure increase occurred but, on cooling, the pressure dropped to the starting pressure. The white solid isolated in 85% yield was diammoniodecaborane-12.

Comparable results were obtained when the dibutyl sulfide adduct of decaborane was substituted for the diethyl sulfide adduct.

Example IV

Five g. decaborane was dissolved in 150 cc. dry benzene and placed in a 300-cc. autoclave. Ammonia was passed into the system until the low pressure developed appeared to drop only slowly, indicating the solution had reached saturation. It was then heated at 110° for about 6 hours. After 6 hours heating, the pressure had increased to 170 lb. The solution was cooled and a 94 percent yield of diammoniodecaborane was obtained.

We claim:
1. Diammoniodecaborane-12 hydrazinate,

2. A process for the preparation of diammoniodecaborane-12 hydrazinate which comprises heating to reflux temperature a mixture of a compound of the formula $B_{10}H_{12} \cdot 2RCN$, in which R is a lower alkyl group containing 1 to 4 carbon atoms, and hydrazine in the presence of an organic liquid which is non-reactive with hydrazine, $B_{10}H_{12} \cdot 2RCN$, and the product of the reaction and in which organic liquid hydrazine is sufficiently insoluble to form a separate hydrazine-containing layer therewith, separating an organic liquid layer and a layer containing hydrazine and diammoniodecaborane-12 hydrazinate, adding a lower alkanol containing 1 to 4 carbon atoms to the hydrazine-containing layer, and crystallizing diammoniodecaborane-12 hydrazinate from said lower alkanol-hydrazine solution.

3. A process as set forth in claim 2 in which the organic liquid is selected from the group consisting of diethyl ether, benzene, hexane, and heptane.

4. A process as set forth in claim 2 in which the lower alkanol is ethanol.

5. A process as set for the in claim 2 in which the reaction is conducted at a temperature of from about 20° C. to about 120° C.

6. A process as set forth in claim 2 in which the compound of the formula $B_{10}H_{12} \cdot 2RCN$ is $B_{10}H_{12} \cdot 2CH_3CN$.

7. A process as set forth in claim 6 in which the molar ratio of $B_{10}H_{12} \cdot 2CH_3CN$ to hydrazine is from about 1 to 10 to about 1 to 30.

8. A process for the preparation of diammoniodecaborane-12 which comprises heating diammoniodecaborane-12 hydrazinate in vacuo at a temperature up to about 120° C. until the evolution of hydrazine ceases and recovering the diammoniodecaborane-12 so formed.

9. A process for the preparation of diammoniodecaborane-12 which comprises heating a mixture of diammoniodecaborane-12 hydrazinate and a compound in which compound diammoniodecaborane-12 is soluble at elevated temperatures and from which compound diammoniodecaborane-12 will crystallize at room or lower temperatures, which compound will remove hydrazine by reaction with hydrazine or by solvation thereof, subsequently cooling said mixture to room temperature and lower temperatures and recovering the diammoniodecaborane-12 which crystallizes from said mixture.

10. A process for the preparation of diammoniodecaborane-12 which comprises heating a mixture of diammoniodecaborane-12 hydrazinate and a compound selected from the group consisting of water, lower alkyl aldehydes, and lower alkyl ketones, subsequently cooling said mixture and recovering the diammoniodecaborane-12 which crystallizes from said mixture.

11. A process for the preparation of diammoniodecaborane-12 which comprises heating to reflux temperature a mixture of a compound of the formula $B_{10}H_{12} \cdot 2RCN$ in which R is a lower alkyl group containing 1 to 4 carbon atoms and hydrazine in the presence of an organic liquid which is non-reactive with hydrazine, $B_{10}H_{12} \cdot 2RCN$ and the product of the reaction and in which organic liquid hydrazine is sufficiently insoluble to form a separate hydrazine-containing layer therewith, separating an organic liquid layer and a layer containing hydrazine and diammoniodecaborane-12 hydrazinate, adding water to the hydrazine-containing layer, and crystallizing diammoniodecaborane-12 from said water-hydrazine solution.

References Cited

UNITED STATES PATENTS

| 2,708,152 | 5/1955  | Schechter et al. | 23—190  |
| 2,754,177 | 7/1956  | Gould            | 23—190  |
| 2,857,258 | 10/1958 | Thomas           | 52—0.5  |
| 2,930,683 | 3/1960  | Adelman          | 52—0.5  |
| 3,264,071 | 8/1966  | Hough            | 23—358  |

OTHER REFERENCES

Stock: "Hydrides of Boron and Silicon," pp 84, 85, 123–127, Cornell University Press (1933). Copy in Scientific Library.

Sinclair: "U.S. Gov't Research Reports," vol. 27, No. 6, p. 307 (June 14, 1957). Copy in Scientific Library. (Abstract refers to PB Report 125535 and Report CCC–1024TR–177.)

Steindler: "J.A.C.S.," vol. 75, p. 756 (1953). Copy in Scientific Library.

Carpenter: "ARS Journal," vol. 29, pp. 8, 10, 11 (January 1959). Copy in Scientific Library.

AEC Document: UCRL 4332, pp. 8–12 (Apr. 19, 1954). Copy in Scientific Library.

Emeleus et al.: "J. Chem. Soc.," pp. 840, 841, March 1951. Copy in Scientific Library.

Shore: "Dissertation Abstracts," vol. 18, p. 1242, April 1958. Copy in Scientific Library.

Schaeffer: "J. Am. Chem. Soc.," vol. 79, pp. 1006–7 (1957). Copy in Scientific Library.

Bagley: "Tech. Abstracts Bulletin," U58-15, p. 2529, Oct. 1, 1958. Copy in Scientific Library.

Carpenter: "Am. Rocket Soc. Journal," vol. 29, pp. 10, 11, January 1959. Copy in Scientific Library.

AEC Document: U.C.R.L. 4332, 17 pp., by W. L. Jolly, Apr. 19, 1954. Copy in Div. 46.

Adams: "Boron, Metallo-Boron Compounds and Boranes," 1964, pp. 657–658.

Dissertation Abstracts: vol. XX, No. 3, pp. 879–880 (September 1959).

Toeniskoetter: "Some Reactions of Decaborane With Electrons and Electron Pair Donors," A Thesis Presented to the Faculty of the St. Louis University in Partial Fulfillment of the Requirements for the Degree of Doctor of Philosophy, 1958, pages 83, 84, 136.

M. WEISSMAN, *Primary Examiner.*

U.S. Cl. X.R.

149—22